US012659548B2

(12) United States Patent (10) Patent No.: US 12,659,548 B2
Agrawal et al. (45) Date of Patent: Jun. 16, 2026

(54) SYSTEMS AND METHODS FOR MANAGING VIDEO BREAKS WITH SKIPPABLE AND NON-SKIPPABLE CONTENT

(71) Applicant: GOOGLE LLC, Mountain View, CA (US)

(72) Inventors: Shweta Agrawal, San Jose, CA (US); Joseph Joseph Cherukara, San Francisco, CA (US); Lamyaa Eloussi, Sunnyvale, CA (US); Li Chen, New York, NY (US); Yongle Cao, Fremont, CA (US); Michael Sun, San Francisco, CA (US); Rachel Mary Pyrdol, San Francisco, CA (US); Jinhui Pan, Saratoga, CA (US); Soumar Aoun, Mountain View, CA (US); Sayali Kulkarni, Santa Clara, CA (US); Amit Ghorawat, Palo Alto, CA (US); Billy Young Won, Mountain View, CA (US); Kai Umezawa, San Francisco, CA (US); Digvijay Singh, Mountain View, CA (US); Hsin-Fang Wu, Palo Alto, CA (US); Reena Merchant, San Francisco, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 18/794,868

(22) Filed: Aug. 5, 2024

(65) Prior Publication Data

US 2026/0039917 A1 Feb. 5, 2026

(51) Int. Cl.
H04N 21/472 (2011.01)
H04N 21/234 (2011.01)
(Continued)

(52) U.S. Cl.
CPC . *H04N 21/47217* (2013.01); *H04N 21/23424* (2013.01); *H04N 21/251* (2013.01); *H04N 21/26233* (2013.01); *H04N 21/4316* (2013.01)

(58) Field of Classification Search
None
See application file for complete search history.

(56) References Cited

U.S. PATENT DOCUMENTS

2011/0243533 A1* 10/2011 Stern .................... H04N 21/812
725/36
2013/0174045 A1* 7/2013 Sarukkai ............ G06Q 30/0255
715/744
(Continued)

OTHER PUBLICATIONS

"How to Find Your YouTube Ad Mix," Think with Google (2017-2019).

(Continued)

*Primary Examiner* — Jason K Lin
(74) *Attorney, Agent, or Firm* — MARSHALL, GERSTEIN & BORUN LLP

(57) ABSTRACT

A method for presenting video content includes receiving and presenting primary video content, receiving a supplemental video content pod, presenting non-skippable videos with a countdown timer, and then presenting skippable videos with a skip control. Another method for providing a supplemental video content pod includes providing the pod to a client device, which then presents non-skippable videos with a countdown timer and skippable videos with a skip control upon reaching a break marker. A system comprises processors and memory to provide a supplemental video content pod to a client device, causing it to present non-skippable and skippable videos with respective controls.

20 Claims, 7 Drawing Sheets

400

RECEIVING PRIMARY VIDEO CONTENT COMPRISING BREAK MARKERS — 410

PRESENTING AT LEAST A PORTION OF THE PRIMARY VIDEO CONTENT — 420

RECEIVING SUPPLEMENTAL VIDEO CONTENT POD COMPRISING NON-SKIPPABLE VIDEOS FOLLOWED BY SKIPPABLE VIDEOS — 430

PRESENTING NON-SKIPPABLE VIDEOS AND A TOTAL NON-SKIPPABLE COUNTDOWN TIMER — 440

PRESENTING AT LEAST A PORTION OF SKIPPABLE VIDEOS AND A SKIP USER INTERFACE CONTROL — 450

(51) Int. Cl.
  *H04N 21/25*       (2011.01)
  *H04N 21/262*      (2011.01)
  *H04N 21/431*      (2011.01)

(56)                References Cited

U.S. PATENT DOCUMENTS

| | | | | |
|---|---|---|---|---|
| 2016/0343038 | A1* | 11/2016 | Sprecher | G06Q 30/0277 |
| 2019/0124376 | A1* | 4/2019 | Gutman | H04N 21/23424 |
| 2020/0304868 | A1* | 9/2020 | Ganjam | H04N 21/4425 |
| 2022/0078516 | A1* | 3/2022 | Loheide | H04N 21/835 |
| 2023/0110586 | A1* | 4/2023 | Robert et al. | H04N 21/458 725/10 |
| 2023/0269424 | A1 | 8/2023 | Robert Jose et al. | |

OTHER PUBLICATIONS

Banerjee et al., "I Hate Ads but Not the Advertised Brands: A Qualitative Study on Internet Users' Lived Experiences with YouTube Ads," Internet Research 33(1):39-56 (2023).
Banerjee et al., "Skipping Skippable Ads on YouTube: How, When, Why and Why Not?" 15th International Conference on Ubiquitous Information Management and Communication (IMCOM) (2021).
Chakraborty et al., "Advertisement Revenue Management: Determining the Optimal Mix of Skippable and Non-Skippable Ads for Online Video Sharing Platforms," European Journal of Operational Research, 292:213-229 (2021).
Haller, "How to Create a Product Story that Unfolds Over Time—And Drives Results," Think with Google (2019).

\* cited by examiner

200

210

230

234B

234A

232B

232A

210

220

300

310

210

400

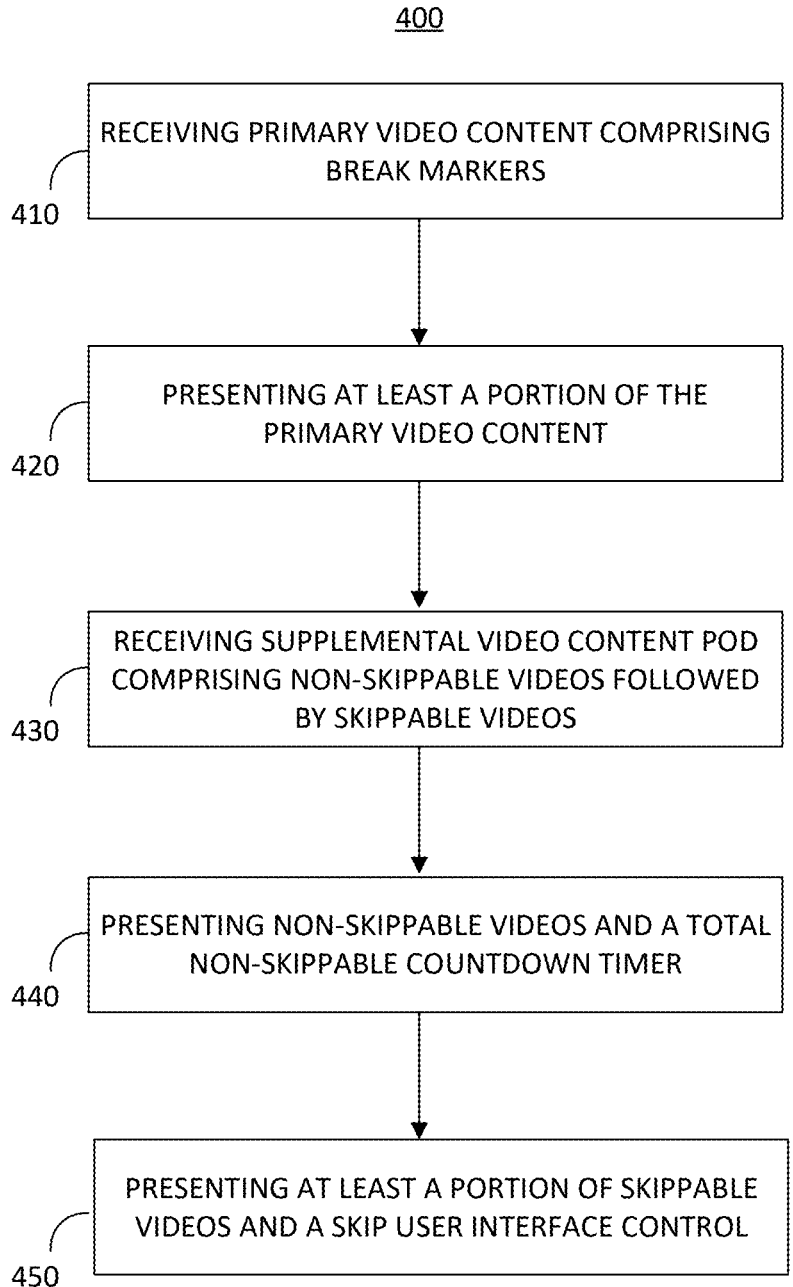

RECEIVING PRIMARY VIDEO CONTENT COMPRISING BREAK MARKERS

410

PRESENTING AT LEAST A PORTION OF THE PRIMARY VIDEO CONTENT

420

RECEIVING SUPPLEMENTAL VIDEO CONTENT POD COMPRISING NON-SKIPPABLE VIDEOS FOLLOWED BY SKIPPABLE VIDEOS

430

PRESENTING NON-SKIPPABLE VIDEOS AND A TOTAL NON-SKIPPABLE COUNTDOWN TIMER

440

PRESENTING AT LEAST A PORTION OF SKIPPABLE VIDEOS AND A SKIP USER INTERFACE CONTROL

PROVIDING SUPPLEMENTAL VIDEO CONTENT POD
COMPRISING NON-SKIPPABLE VIDEOS FOLLOWED
BY SKIPPABLE VIDEOS

510

CAUSING CLIENT DEVICE TO PRESENT NON-
SKIPPABLE VIDEOS AND A TOTAL NON-SKIPPABLE
COUNTDOWN TIMER

520

CAUSING CLIENT DEVICE TO PRESENT AT LEAST A
PORTION OF SKIPPABLE VIDEOS AND A SKIP USER
INTERFACE CONTROL

530

SYSTEMS AND METHODS FOR MANAGING VIDEO BREAKS WITH SKIPPABLE AND NON-SKIPPABLE CONTENT

FIELD OF TECHNOLOGY

The present embodiments relate to computer-implemented methods, systems, and media for managing and presenting video content, and more particularly, to techniques for integrating and controlling the presentation of one or more non-skippable and skippable supplemental videos within primary video content.

BACKGROUND

In contemporary digital video platforms, including those accessible via television screens, the insertion and management of supplemental video content (e.g., digital advertisements) during primary video content have seen considerable evolution. These platforms can utilize a mix of non-skippable and skippable supplemental video content, each serving distinct content provider and user experience goals. Skippable supplemental video content provides a "skip" button, which allows the user to skip either the present skippable supplemental video or the remaining supplemental video content and takes the user to the primary video content. Non-skippable supplemental video content is more likely to result in viewer engagement with the supplemental video content as can be measured by one or more performance metrics (e.g., impression rates, click-through rates, conversion rates, etc.), while skippable supplemental video content offers viewers a higher degree of control over the viewing experience and is more likely to improve other performance metrics (e.g., lower viewer abandonment rates for the primary video content). Identifying and maintaining an acceptable balance between the two, however, has proven to be a challenge.

Currently, some supplemental video content delivery systems seek to achieve an acceptable balance by displaying the number of supplemental content items and the duration of each supplemental content item within a break, providing viewers with some insight into the length of interruptions. This approach, however, has limitations when applied to a combination of skippable and non-skippable supplemental video content. For instance, skippable supplemental video content introduces uncertainty regarding the total duration of the supplemental video content break, as viewers may opt to skip, shortening the break unpredictably. Additionally, the emphasis on the number of supplemental content items can mislead or otherwise fail to inform viewers, particularly when supplemental content items of varying lengths are combined, leading to undesirable outcomes such as the abandonment of the primary video content. These concerns underscore the complexities involved in designing user interfaces for supplemental video content delivery systems that cater to diverse viewer preferences and behaviors.

Given these challenges, there are opportunities for improved platforms and technologies that address the delicate balance between supplemental content provider (e.g., advertiser) goals/metrics and primary content provider (e.g., content creator) goals/metrics.

SUMMARY

In some embodiments, the supplemental content pod includes one or more non-skippable videos followed by one or more skippable videos. If skippable videos are presented at the start of the break, and the user skips, all supplemental content videos in that content break will be skipped. To address this problem non-skippable videos are placed at the beginning of the supplemental video content pod, and skippable ads at the end of the pod. This ensures that if the user skips a skippable video, only one or more of the skippable videos is skipped. In some embodiments, the supplemental content pod may include fewer but longer supplemental content videos, which may have a similar total duration, but fewer supplemental videos may provide a better viewer experience.

In one embodiment, a computer-implemented method for presenting video content includes: (1) receiving, by one or more processors, primary video content including one or more break markers; (2) presenting, by the one or more processors and on a display, at least a portion of the primary video content; (3) receiving, from a server and by the one or more processors, a supplemental video content pod including (i) one or more non-skippable videos, followed by (ii) one or more skippable videos; (4) upon reaching one of the one or more break markers in the primary video content, presenting, by the one or more processors and on the display, the one or more non-skippable videos, and a total non-skippable countdown timer, the total non-skippable countdown timer indicating a non-skippable duration that (i) is at least as long as a total remaining duration of the one or more non-skippable videos, and (ii) does not include a full duration of a first video, of the one or more skippable videos, that immediately follows the one or more non-skippable videos; and (5) upon reaching an end of the non-skippable duration, presenting, by the one or more processors and on the display, (i) at least a portion of the one or more skippable videos, and (ii) a skip user interface control that enables a user to skip at least one remaining video of the one or more skippable videos.

In another embodiment, a computer-implemented method for providing video content includes: (1) providing, by one or more processors and to a client device, a supplemental video content pod, wherein the supplemental video content pod includes one or more non-skippable videos followed by one or more skippable videos, and wherein providing the supplemental video content pod causes the client device to: (a) upon reaching a break marker in primary video content presented by the client device on a display, present on the display the one or more non-skippable videos and a total non-skippable countdown timer, the total non-skippable countdown timer indicating a non-skippable duration that (i) is at least as long as a total remaining duration of the one or more non-skippable videos, and (ii) does not include a full duration of a first video, of the one or more skippable videos, that immediately follows the one or more non-skippable videos, and (b) upon reaching an end of the non-skippable duration, present on the display (i) at least a portion of the one or more skippable videos, and (ii) a skip user interface control that enables a user to skip at least one remaining video of the one or more skippable videos.

In yet another embodiment, a system comprises: (1) one or more processors; and (2) a memory storing instructions that, when executed by the one or more processors, cause the one or more processors to: (a) provide, to a client device, a supplemental video content pod, wherein the supplemental video content pod includes one or more non-skippable videos followed by one or more skippable videos, and wherein providing the supplemental video content pod causes the client device to: (i) upon reaching a break marker in primary video content presented by the client device on a display, present on the display the one or more non-skippable videos, and a total non-skippable countdown timer, the total non-skippable countdown timer indicating a non-skippable duration that (i) is at least as long as a total remaining duration of the one or more non-skippable videos, and (ii) does not include a full duration of a first video, of the one or more skippable videos, that immediately follows the one or more non-skippable videos, and (ii) upon reaching an end of the non-skippable duration, present on the display (i) at least a portion of the one or more skippable videos, and (ii) a skip user interface control that enables a user to skip at least one remaining video of the one or more skippable videos.

In one embodiment, a system or method for presenting video content on a display presents two timers: a first, non-skippable timer that displays the total remaining duration of one or more remaining non-skippable videos, and a second, skippable timer that replaces the non-skippable timer only after the skip button appears and counts down the remaining duration of the present skippable video or the remaining duration of the one or more skippable videos. The display may indicate the number of remaining supplemental videos during the supplemental content break, such as through notches, dots, or other visual indicators on the timer. The skip button may skip only the presently playing skippable video, or may skip all remaining skippable video(s), depending on the embodiment. In embodiments where only one video is skipped, the skippable timer may reduce by the remaining duration of the skipped video. The non-skippable timer and/or the skippable timer may more generally show "90+ sec", or some other threshold amount of time, for longer durations.

In some embodiments, the disclosed techniques for presenting video content may apply only to particular types of videos, such as long format videos and/or premium videos. The disclosed techniques may apply to specified client device surface types. A server may apply a machine learning (ML) model to account for a number of factors to determine whether to apply the disclosed techniques.

In some embodiments, the display presents a message to the user that the system or method will be applied to the supplemental video content breaks.

In some embodiments, the system or method identifies evenly spaced but natural supplemental video content breaks that locate the break at a good (e.g., less intrusive) time in the flow of the primary content. The system or method may identify breaks by evenly spacing the breaks apart by a specified number of minutes. The system or method may apply a custom search algorithm to split the video into evenly spaced potential breaks, define a break candidate time window around these potential breaks, and identify the natural break within this break candidate time window.

In some embodiments, the system or method rewards users with longer interruption-free time in exchange for longer supplemental content breaks. The server may increase the time between supplemental content breaks based on the total duration of the supplemental content breaks, for example.

In some embodiments, the system or method modifies supplemental content prediction metrics to account for the break type. For example, users may be less likely to view the entirety of a skippable video that is located at the end of a long supplemental pod. The system or method may incorporate supplemental content pod depth, i.e., the position within the pod, into an ML model that determines these prediction metrics.

In some embodiments, the system or method models for viewer cost and a duration cost. In some embodiments, the system or method prioritizes the non-skippable video content over the skippable video content in a supplemental video content pod.

Advantages will become more apparent to those of ordinary skill in the art from the following description of the preferred embodiments which have been shown and described by way of illustration. As will be realized, the present embodiments may be capable of other and different embodiments, and their details are capable of modification in various respects. Accordingly, the drawings and description are to be regarded as illustrative in nature and not as restrictive.

BRIEF DESCRIPTION OF THE DRAWINGS

The figures described below depict various implementations of the system and methods disclosed herein. It should be understood that each figure depicts an embodiment of a particular implementation of the disclosed systems, methods, and media, and that each of the figures is intended to accord with a possible embodiment thereof.

There are shown in the drawings arrangements which are presently discussed, it being understood, however, that the present embodiments are not limited to the precise arrangements and instrumentalities shown, wherein:

FIG. 4 depicts an example computer-implemented method for presenting video content on a client device, according to some implementations.

DETAILED DESCRIPTION OF THE DRAWINGS

Figure 1:
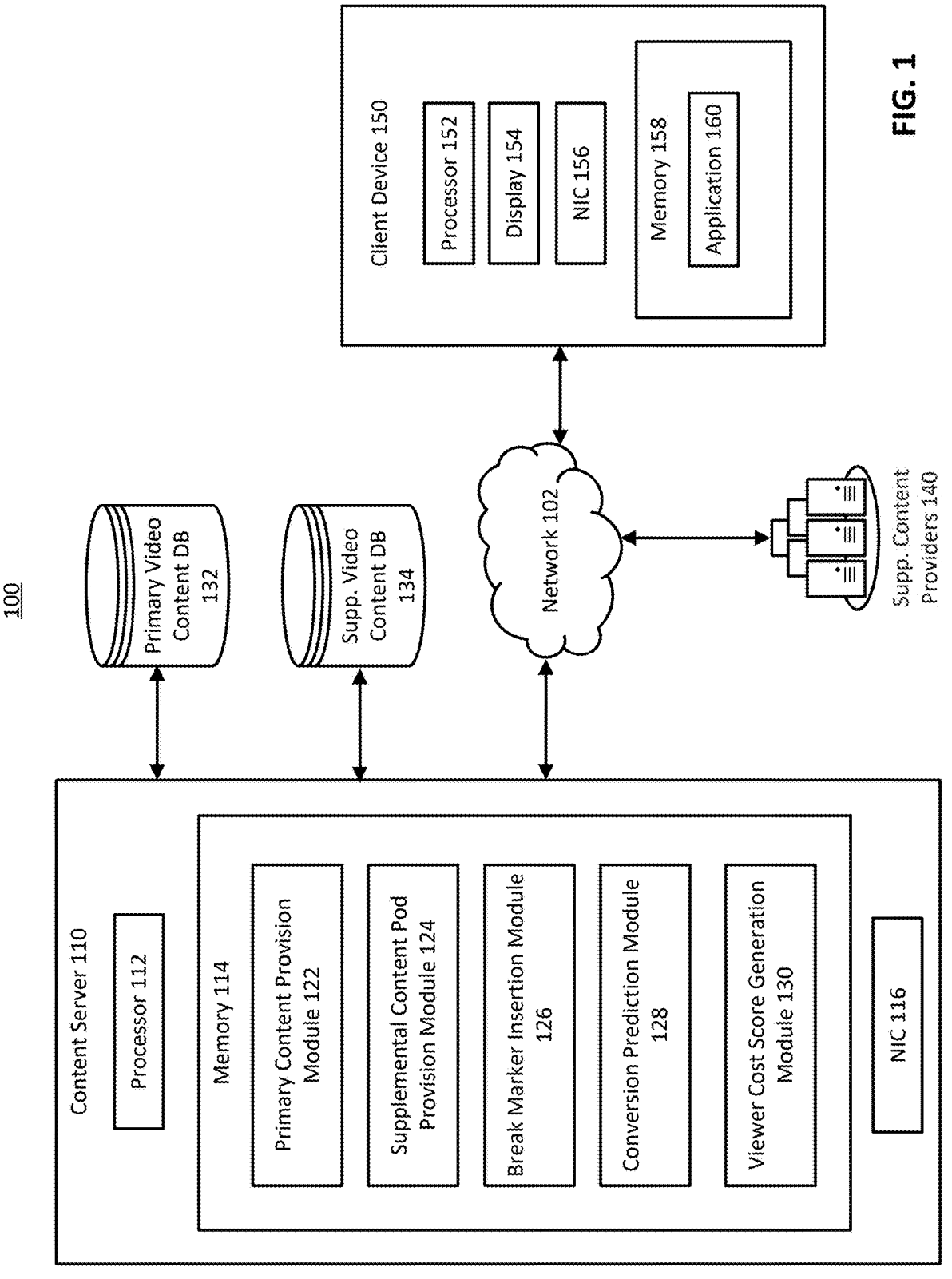
FIG. 1 depicts an example computing environment configured to manage supplemental video content presentation in primary video content, according to some implementations.

The present techniques focus on enhancing the user experience of video content consumption, particularly on platforms where primary video content is interspersed with breaks during which supplemental video content is presented. These techniques address the challenge of presenting supplemental video content without overly degrading performance metrics important to supplemental content providers or performance metrics important to primary content providers. These techniques involve a method for presenting primary video content along with supplemental video content pods, the latter of which each include a mix of non-skippable and skippable videos. This method is computer-implemented and manages the presentation of primary video content and the integration of supplemental video content (e.g., at designated break markers).

More specifically, the present techniques include presenting non-skippable videos followed by skippable videos, with a clear indication of the remaining non-skippable duration through a total non-skippable countdown timer. This timer provides viewers with a more precise understanding of how long they will be engaged with non-skippable content before having the option to skip remaining videos via a user interface control, addressing a common frustration among viewers regarding the unpredictability of supplemental video content break durations, which in turn lowers the likelihood of abandonment of the primary video content.

Some aspects of the present disclosure also, or instead, improve the selection and insertion of break markers within the primary video content. By selecting break points based on characteristics of the primary video content (e.g., to provide supplemental content at more natural break points), while also utilizing candidate time windows tied to specific break intervals, a good balance can be achieved between avoiding unexpected or jarring breaks in the primary video content while also avoiding break spacings that are too short (e.g., overly disruptive to the primary content) or too long (e.g., resulting in too few supplemental content items being presented before the primary video content ends). Again, this can provide a good balance between performance metrics important to supplemental content providers and performance metrics important to primary content providers.

In addition to these improvements, in some embodiments, the present techniques also introduce mechanisms for further improving performance metrics. For example, by generating conversion predictions for skippable videos and/or viewer cost scores, the system can tailor the supplemental video content presentation to maximize the likelihood of viewer engagement and purchase intent. This may be achieved by considering factors such as the depth, i.e., position within the sequence of supplemental videos, of the skippable video within the supplemental content pod and the overall supplemental video content break duration, thereby enabling a more strategic placement of supplemental content that balances performance metrics with viewer satisfaction.

Overall, the present techniques represent a comprehensive approach to improving the video content viewing experience and various performance metrics by addressing key challenges associated with supplemental video content presentation. Through a combination of user-friendly features, strategic supplemental video content placement, and machine learning-driven improvements, these techniques offer a solution that enhances viewer satisfaction while also supporting the performance metrics goals of both supplemental content providers (e.g., higher impression rates, click-through rates, etc.) and primary content providers (e.g., lower viewer abandonment rates).

FIG. 1 illustrates a computing environment 100 for managing supplemental video content presentation in primary video content to enhance user experience and performance metrics. In the depicted embodiment, the computing environment 100 includes a network 102, a content server 110, a primary video content database 132, a supplemental video content database 134, one or more supplemental content providers 140, and a client device 150.

The network 102 may be a single communication network or may include multiple communication networks of one or more types, such as LANs and WANs (e.g., the Internet). In some embodiments, the network 102 connects the content server 110 with the supplemental content providers 140 and client device 150, enabling the exchange of primary video content and supplemental video content pods.

In some embodiments, the content server 110 includes a processor 112, a memory 114, and a network interface controller (NIC) 116. The processor 112 may include any number of processors and/or processor types, such as central processing units (CPUs), graphics processing units (GPUs), and others, configured to execute software instructions stored in the memory 114. The memory 114 may include volatile and/or non-volatile memory, such as RAM, ROM, and others, having stored thereon one or more sets of computer-executable instructions. The NIC 116 includes any suitable network interface controller(s), facilitating networking over the network 102 between the content server 110 and other components, such as the supplemental content providers 140 and client device 150.

In some embodiments, the memory 114 includes a plurality of modules, each being a respective set of computer-executable instructions. These modules in the example of FIG. 1 include a primary content provision module 122, a supplemental content pod provision module 124, a break marker insertion module 126, a conversion prediction module 128, and a viewer cost score generation module 130.

In some embodiments, the primary content provision module 122 supports operations for providing primary video content for display at a client device 150. The primary content provision module 122 may receive requests for primary video content from the client device 150 and send the requested primary video content to the client device 150 through streaming or downloading.

In some embodiments, the supplemental content pod provision module 124 is responsible for providing supplemental video content pods to the client device 150 upon request. The supplemental video content pods may include one or more non-skippable videos followed by one or more skippable videos.

In some embodiments, the break marker insertion module 126 supports inserting break markers in primary video content based on various criteria, such as the length of the video content and a break interval (e.g., an evenly spaced specified duration between breaks) to identify potential breaks. In some embodiments, the break marker insertion module 126 includes or accesses an ML model configured to apply a custom search algorithm to detect natural break points at or around each potential break in the primary video content define a break candidate time window around each of these potential breaks (e.g. if a potential break is at minute 8:00 in the primary video content and the break candidate time window is one minute, the ML model may look for breaks between 7:00 to 9:00), and identify the natural break within this break candidate time window. For example, to identify the natural break, the ML model may detect scene transitions and/or pauses in speaking within the break candidate time window for a break marker insertion.

In some embodiments, the conversion prediction module 128 generates conversion predictions for skippable videos based on the depth of the skippable video within the supplemental video content pod and/or other factors. In some embodiments, the conversion prediction module 128 includes or accesses an ML model to predict conversions. For example, the conversion prediction may be an estimate of the likelihood that a user selects the skippable video and purchases an associated product or service. The conversion prediction module may predict a probability that the user will view the entirety of (instead of skipping) a skippable video. Generally, the conversion prediction module 128 may estimate that skippable videos nearer to the beginning of the supplemental video content pod have a higher likelihood of conversion than skippable videos deeper in the supplemental video content pod. The conversion prediction module 128 may incorporate supplemental content pod depth, i.e., the position within the pod, into a ML model that determines these prediction metrics. In some embodiments, the conversion prediction module 128 prioritizes the non-skippable video content over the skippable video content in a supplemental video content pod. If too few non-skippable videos are in the supplemental video content pod, skippable videos will be presented relatively early in the pod, and users may skip the majority of supplemental content in the pod. To address this, the conversion prediction module 128 may include a new term either through an allocation term, i.e., an assignment of supplemental content to supplemental content slots, or a yield term, i.e., a price for a supplemental content slot, in a supplemental content auction that models this prioritization of non-skippable value.

In some embodiments, the viewer cost score generation module 130 estimates the likelihood of a user exiting the primary video content during the non-skippable duration by considering factors such as the total break marker count (how many supplemental content breaks are in the primary video content) and the total supplemental video content pod duration (the total duration of all the supplemental content breaks). The viewer cost score generation module 130 may determine a viewer cost, i.e., frustration based upon an interruption cost (which will be set irrespective of break length), and a duration cost (which will vary, linearly or non-linearly, with break length). The viewer cost score generation module 130 may include an ML model for estimating a viewer cost score. The viewer cost score may indicate a frustration level of a user given the frequency or length of supplemental video content breaks, for example.

The functionality above described for modules 122-130 can be divided differently among the modules, all performed by a single module, or arranged in any other suitable manner. Some modules may be omitted (e.g., the break marker insertion module 126, the content prediction module 128, and/or the viewer cost score generation module 130). Different servers may implement different modules or portions thereof; for example, the content presentation module 122 could execute on a first content server and the supplemental content pod provision module 124 could execute on second content server.

In some embodiments, the primary video content database 132 includes a plurality of primary videos. The content presentation module 122 may retrieve the primary videos from the primary video content database 132 to serve to a client device such as client device 150. In some embodiments, the supplemental video content database 134 includes a plurality of supplemental videos. The supplemental content pod provision module 122 may retrieve the supplemental videos from the supplemental video content database 134 to include in a supplemental content pod. Supplemental content providers 140 may upload the supplemental videos into the supplemental video content database 134. In one example, the primary video content is a video available on a content sharing platform, such as YouTube, and the supplemental video content includes digital advertisements such as filmed video segments, short animation sequences, and/or other video content.

The client device 150 may include any stationary, mobile, and/or portable computing device with wired and/or wireless communication capability (e.g., a smartphone, a tablet computer, a laptop computer, a desktop computer, a smart home device, a smart wearable device such as smart glasses, smart headsets, or a smart watch, a vehicle head unit computer, etc.). In the example implementation of FIG. 1, the client device 150 includes a processor 152, display 154, a NIC 156, and a memory 158. The processor 152 may be a single processor (e.g., a CPU), or may include a set of processors (e.g., multiple CPUs, or one or more CPUs and one or more GPUs).

The display 154 may include hardware, firmware, and/or software configured to enable a user to view visual outputs of the client device 150, and may use any suitable display technology (e.g., LED, OLED, LCD, etc.). In some implementations, the display 154 may be incorporated in a touch-screen having both display and manual input capabilities. Moreover, in some implementations where the client device 150 is a wearable device, the display 154 may be a transparent viewing component (e.g., lenses of smart glasses) with integrated electronic components. For example, the display 154 may include micro-LED or OLED electronics embedded in lenses of smart glasses.

The NIC 156 may include hardware, firmware, and/or software configured to enable the client device 150 to exchange electronic data with the content server 110 via the network 102. For example, the NIC 156 may include a cellular communication transceiver, a WiFi transceiver, and/or transceivers for one or more other wired and/or wireless communication technologies.

The memory 158 may include one or more computer-readable, non-transitory storage units or devices, which may include persistent (e.g., hard disk) and/or non-persistent memory components. The memory 158 may store instructions that are executable on the processor 152 to perform various operations, including the instructions of various software applications and the data generated and/or used by such applications. In the example implementation of FIG. 1, the memory 158 stores at least an application 160, which may be, for example, a web browser application (e.g., Chrome), or a mobile application (e.g., YouTube) downloaded from an application store.

Generally, the application 160 may be executed by the processor 152 to present the video content to the user of the client device 150 via the display 154, where the video content may include primary video content and supplemental video content. In an implementation where the application 160 is a web browser, for instance, the video content may be included on a web page hosted by the content server 110, with the browser causing the client device 150 to download HTML, scripts, and/or other code of the web page for presentation to a user via the display 154. As another example, the application 160 may be a video sharing application, such as a downloaded YouTube mobile application, and the video content may include a streaming video presented via the display 154.

While FIG. 1 shows client device 150 as a single component communicating directly (i.e., via network 102) with the content server 110, in some implementations the sub-components of client device 150 shown in FIG. 1 are instead divided among two or more user-side devices. As just one example, a pair of smart glasses may include the processor 152, the display 154, and a memory, while a smartphone may include another processing unit, the memory 158, another display, and the NIC 156. The smart glasses (or smart helmet, etc.) may then communicate as needed with the smartphone (e.g., via Bluetooth) to enable the operations described herein.

In operation, the content server 110 functions to enhance the user experience of watching video content with supplemental video content breaks, and to improve (e.g., mitigate degradation of) performance metrics associated with the primary and/or supplemental video content. Upon receiving a request for supplemental content from a client device 150, the content server 110 provides a supplemental video content pod that includes a mix of non-skippable and skippable videos. The supplemental content pod is arranged in a particular order, with one or more non-skippable videos followed by one or more skippable videos. In some embodiments, the supplemental content pod may include associated data that causes application 160 to present, in a specified order on the display 154, the non-skippable videos and a total non-skippable countdown timer that does not include the full duration of the first skippable video. This approach can reduce the number of interruptions and make supplemental content breaks more predictable, thereby addressing user frustrations with frequent supplemental content breaks and unclear total supplemental content duration. In some embodiments, the supplemental content pod may include fewer but longer supplemental content videos, which may have a similar total duration, but fewer supplemental videos may provide a better viewer experience. This, in turn, can lead to improved viewer cost scores and improved performance metrics (e.g., click-through or conversion rates). The content server 110 may also incorporate ML models to determine ideal break points and to predict user behavior, such as the likelihood of skipping ads or exiting the video content, thereby enabling better performance metrics and improved overall user experience. The ML model may account for one or more factors, including length of the video, popularity of the video, historic completion rate of the video, number of interruptions the user has experienced in that session or recently, video content type, time of day, surface watched, and/or other factors/features/inputs to determine whether or not to apply the disclosed techniques. In some implementations, the content server 110 may apply the disclosed techniques only to long format videos, "premium" videos (as determined by a number of views, likes, etc.), and/or specified client device 150 surfaces (televisions, smartphones, personal computers, etc.). The content server 110 may rewards users with longer interruption free time in exchange for longer supplemental content breaks. The content server 110 may elongate time between supplemental content breaks based on the total duration of the supplemental content breaks.

Figure 2:
FIG. 2 depicts an example timeline of primary video content with a supplemental video content pod, according to one implementation and scenario.

FIG. 2 depicts an example video timeline 200 for presenting primary video content 210. The primary video content 210 includes one or more break markers 220. The primary video content 210 serves the primary video content 210 to client device 150 (e.g., in response to a request from the client device 150), and possibly also to other similar client devices at the same time (e.g., if primary video content 210 is live content), and client device 150, via the application 160, and any other recipient client device(s) play the primary video content 210 on their respective displays (e.g., display 154).

When presentation of the primary video content 210 reaches the break marker 220, the application 160 pauses the primary video content 210 and presents a supplemental video content pod 230. The application 160 may download and cache the supplemental video content pod 230 prior to reaching the break marker 220 or the content servers 110 may serve the supplemental video content pod 230 to the application 160 when the break marker is reached. In the illustrated example, the supplemental video content pod 230 includes two non-skippable videos 232A and 232B and two skippable videos 234A and 234B.

The application 160 sequentially presents the non-skippable videos 232A and 232B. During the non-skippable videos 232A and 232B, the application 160 may display a total non-skippable countdown timer that displays the total remaining duration of the non-skippable videos 232A and 232B. Shortly after, e.g., 0, 1, 2, or 3 seconds, presenting the non-skippable videos 232A and 232B, the application begins presenting the skippable video 234A and presents a skip user interface control and a skippable countdown timer. The application 160 may first present the skip user interface control when or shortly after the application 160 starts presenting the skippable video 234A and continue to present the skip user interface control while the skippable video 234A is shown, so long as the user does not select the skip user interface control. When and if the user does select the skip user interface control, however, the client device skips the remainer of the skippable video 234A and begins presenting the skippable video 234B or, in some embodiments, skips both the remainder of the skippable video 234A and the entire skippable video 234B. In some embodiments, the content server 110 includes data in the supplemental video content pod 230 that causes the application 160 to present the total non-skippable countdown timer, the skippable countdown timer, and/or the skip user interface control with functionality and timing as disclosed herein. In some embodiments, the application 160 presents the total non-skippable countdown timer, the skippable countdown timer, and/or the skip user interface control (in the manner described above) based on indicators or tags within the supplemental video content pod that inform the application 160 as to which videos are non-skippable and which videos are skippable.

After the client device 150 presents or skips the final video, e.g., skippable video 234B, the client device 150 continues playing the primary video content 210.

Figure 3A:
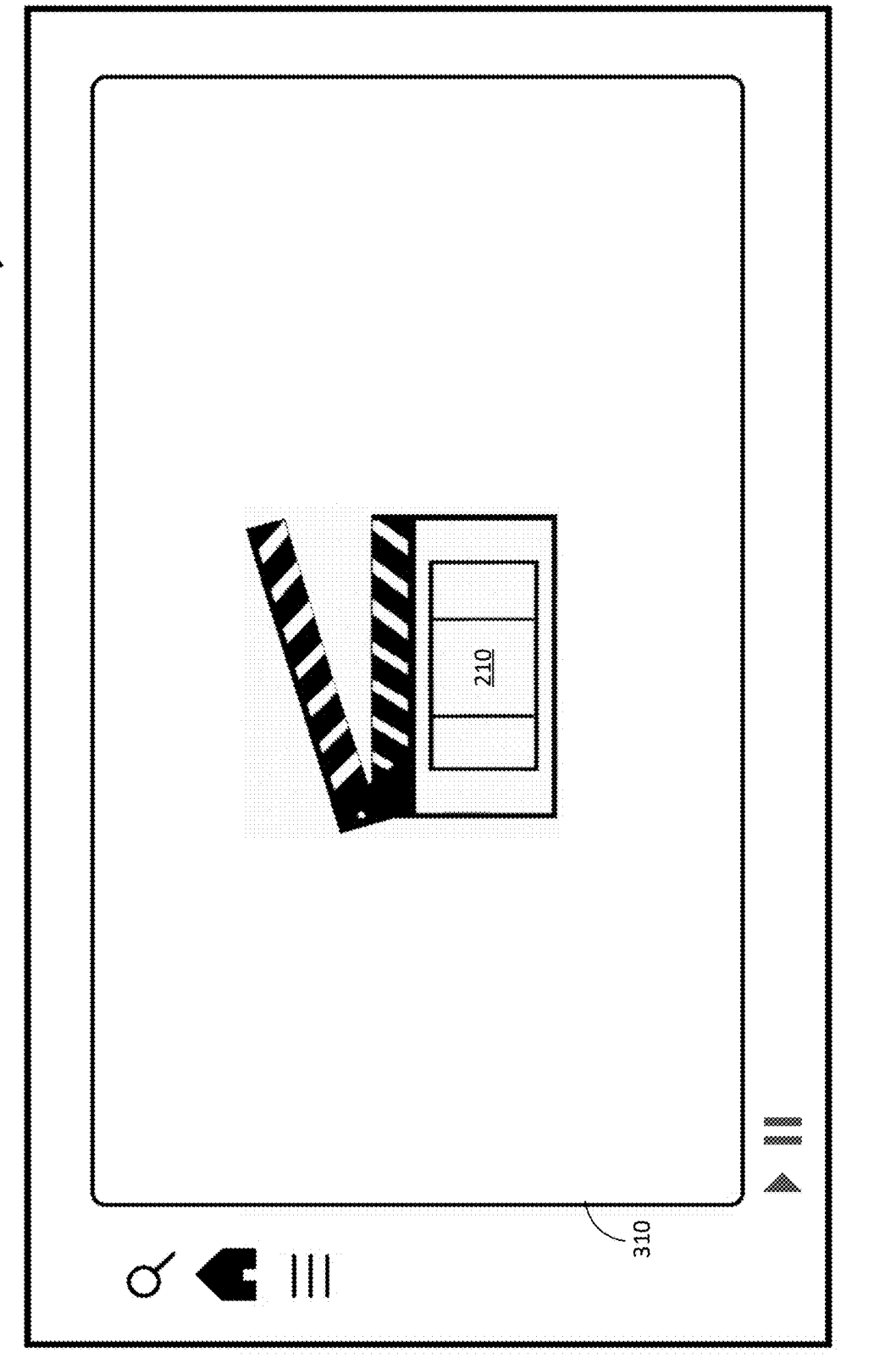
FIGS. 3A-3C depict an example user interface of a client application for presenting primary video content and supplemental video content, according to some implementations.
Figure 3B:
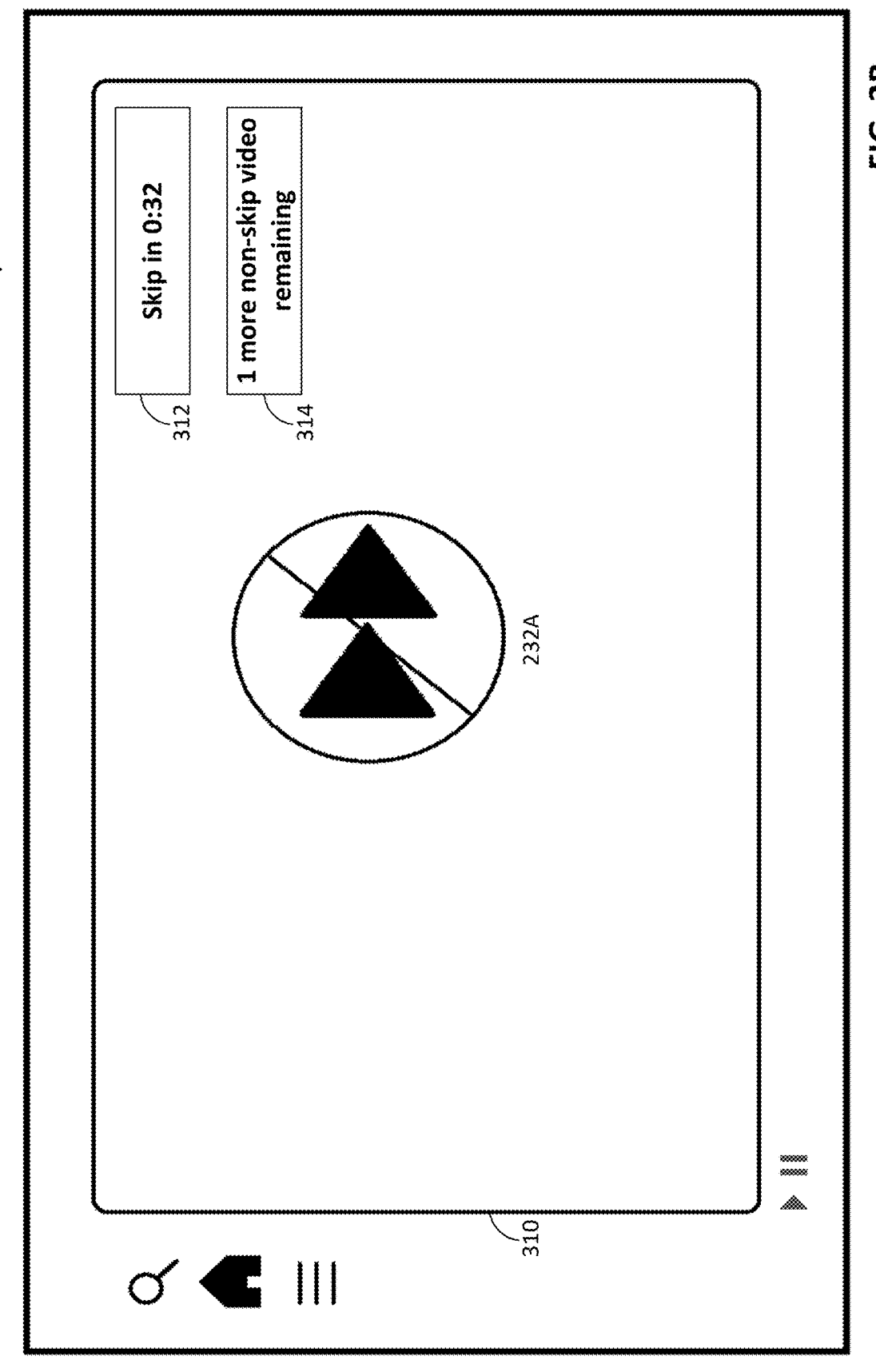
Figure 3C:
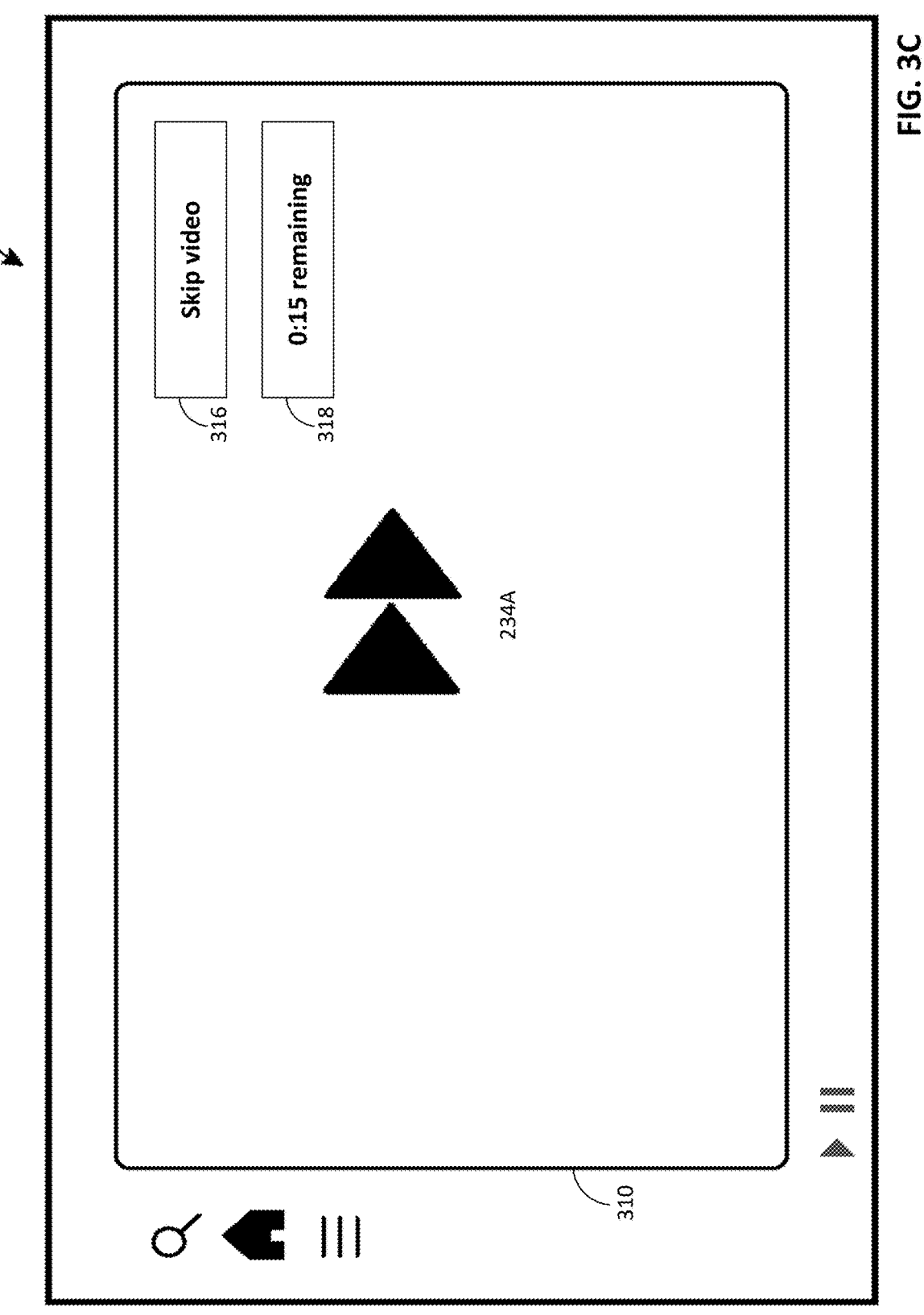

FIGS. 3A-3C depict an example user interface 300 on the client device 150 for the application 160 (e.g., YouTube), where the application 160 may be a web browser providing the user interface 300 as a web page on the display 154, or the application 160 may be a dedicated application providing the user interface 300 as a screen on the display 154. The user interface 300 may include a video content slot 310 for presenting primary video content and supplemental video content.

FIG. 3A depicts the user interface 300 presenting the primary video content 210 in the video content slot 310. The user interface 300 may present a message or other visual indicator to the user, either at the start of the primary video content 210 or during a supplemental content break, that the disclosed techniques will be applied to the supplemental content breaks.

FIG. 3B depicts the user interface 300 presenting the non-skippable video 232A in the video content slot 310. During presentation of a non-skippable video, the user interface 300 may display a total non-skippable countdown timer 312 and/or a remaining non-skippable counter 314. The total non-skippable countdown timer 312 may indicate a remaining duration until an end of one or more remaining non-skippable videos in the supplemental video content pod 230. The remaining non-skippable counter 314 may indicate a remaining number of non-skippable videos in the supplemental video content pod 230. The remaining non-skippable counter 314 may indicate the remaining number of videos through a text display, e.g., "1 more non-skippable video remaining," or through notches, dots, etc. on or proximate to the total non-skippable countdown timer 312.

FIG. 3C depicts the user interface 300 presenting the skippable video 234A in the video content slot 310. During presentation of a skippable video, the user interface 300 may display a skip user interface control 316. In one embodiment, selection of the skip user interface control 316 may skip the remaining duration of the present skippable video, e.g., skippable video 234A, and may present the next skippable video, e.g., skippable video 234B, in the supplemental video content pod 230. In one embodiment, selection of the skip user interface control 316 may skip all remaining skippable videos.

During presentation of a skippable video, the user interface 300 may display a skippable countdown timer 318. In one implementation, the skippable countdown timer 318 may display a remaining duration of a currently displayed skippable video of the one or more skippable videos. In another implementation, the skippable countdown timer 318 may display a total remaining skippable duration of the one or more skippable videos. In response to selection of the skip user interface control 316, the skippable countdown timer 318 may reduce by the remaining duration of the skipped video. In some embodiments, total non-skippable countdown timer 312 and/or the skippable countdown timer 318 may show "90+ sec" or some other thresholds for longer durations.

FIG. 4 depicts a flow diagram of an exemplary computer-implemented method 400 for presenting video content. One or more steps of the method 400 may be implemented as a set of instructions stored on a computer-readable memory and executable on one or more processors. The method 400 of FIG. 4 may be performed/implemented by a device or system, such as the client device 150.

The example method 400 includes, at block 410, receiving primary video content. The application 160 may request and receive the primary video content from the content server 110. The primary video content may include one or more break markers.

The method 400 also includes, at block 420, presenting at least a portion of the primary video content. The application 160 may present the primary video content on the display 154.

The method 400 also includes, at block 430, receiving a supplemental video content pod including (i) one or more non-skippable videos, followed by (ii) one or more skippable videos. The application 160 may receive the supplemental video content pod from the content server 110. The application 160 may request the supplemental video content pod at the time the primary video content is received, at the time of a break marker, or another time.

The method 400 also includes, upon reaching one of the one or more break markers in the primary video content at block 430, presenting the one or more non-skippable videos, and the total non-skippable countdown timer 312. The application 160 may display the non-skippable videos and the total non-skippable countdown timer in the display 154. The total non-skippable countdown timer 312 may indicate a non-skippable duration that (i) is at least as long as a total remaining duration of the one or more non-skippable videos, and (ii) does not include a full duration of a first video, of the one or more skippable videos, that immediately follows the one or more non-skippable videos. In some embodiments, the application 160 presents on the display 154 an indication of a total count of remaining non-skippable videos. In some embodiments, the application 160 presents on the display 154 an indication of a total count of remaining non-skippable videos and remaining skippable videos.

The method 400 also includes, upon reaching an end of the non-skippable duration at block 440, presenting (i) at least a portion of the one or more skippable videos, and (ii) a skip user interface control 316. The application 160 may present the one or more skippable videos and the skip user interface control 316 on the display 154. Selection of the skip user interface control 316 may skip at least one remaining video of the one or more skippable videos. In some embodiments, responsive to receiving a selection of the skip user interface control 316 before an end of the total remaining duration of the one or more skippable videos, the application 160 skips a remainder of the one or more skippable videos and presents on the display 154 a remainder of the primary video content. In some embodiments, responsive to receiving a selection of the skip user interface control 316 before an end of the total remaining duration of the one or more skippable videos, the application 160 skips a remainder of a current skippable video of the one or more skippable videos and presents on the display 154 a next skippable video of the one or more skippable videos. In some embodiments, the application 160 presents a skippable countdown timer 318 indicating a remaining duration of a currently displayed skippable video of the one or more skippable videos. In some embodiments, the application 160 presents a skippable countdown timer 318 indicating a total remaining skippable duration of the one or more skippable videos.

It should be understood that not all blocks of the exemplary computer-implemented method 400 are required to be performed, and/or the method 400 may include additional blocks not shown in FIG. 4.

Figure 5:
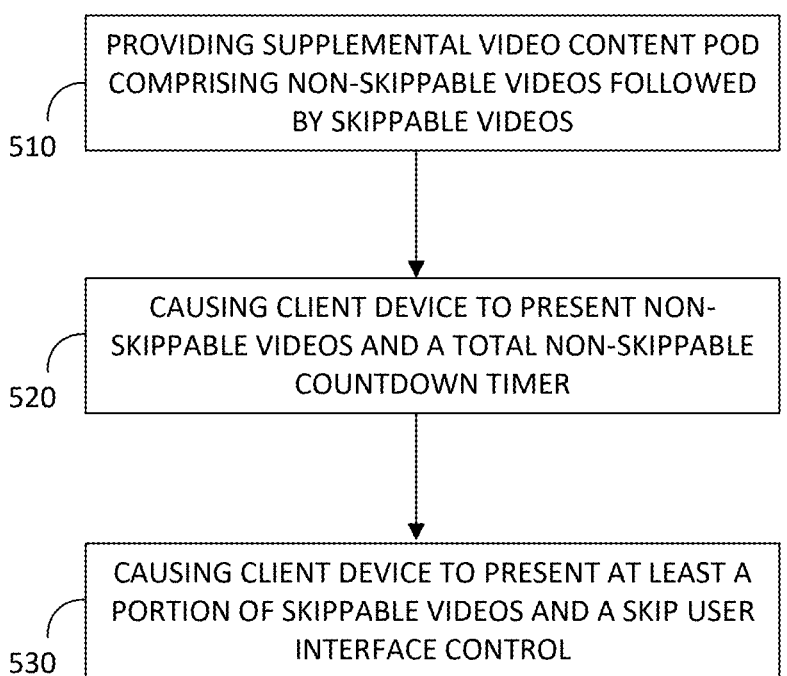
FIG. 5 depicts an example computer-implemented method for providing a supplemental video content pod to a client device, according to some implementations.

FIG. 5 depicts a flow diagram of an exemplary computer-implemented method 500 for providing a supplemental video content pod. One or more steps of the method 500 may be implemented as a set of instructions stored on a computer-readable memory and executable on one or more processors. The method 500 of FIG. 5 may be performed/implemented by a device or system, such as the content server 110.

In some embodiments, the method 500 includes providing to the client device the primary video content including one or more break markers. The content server 110 may provide the primary video content to the client device 150. The method 500 may include inserting the one or more break markers in the primary video content. The break marker insertion module 126 may insert the one or more break markers. Inserting the one or more break markers in the primary video content may include inserting a plurality of break markers. Inserting the plurality of break markers may include determining a plurality of break candidate time windows that are distributed according to a break interval and each includes a respective portion of the primary video content. Inserting the plurality of break markers in the primary video content may include inserting a break marker at each of the plurality of break candidate time windows in the primary video content based on one or more characteristics of a respective portion of the primary video content. Inserting the one or more break markers in the primary video content may include determining the break interval based on a length of the primary video content and a content break count.

The example method 500 includes, at block 510, providing to the client device the supplemental video content pod. The content server 110 may provide the supplemental video content pod to the client device 150. The supplemental video content pod may include one or more non-skippable videos followed by one or more skippable videos. The supplemental content pod provision module 124 may retrieve the one or more non-skippable videos and the one or more skippable videos from the supplemental video content database 134. Providing the supplemental video content pod may cause the client device to perform blocks 520 and 530.

The method 500 may include generating a conversion prediction for a skippable video of the one or more skippable videos. The conversion prediction may be generated by the conversion prediction module 128. The conversion prediction may be generated at least in part by supplying a depth of the skippable video within the supplemental video content pod to a machine learning model. The conversion prediction may estimate a likelihood of the user making a purchase associated with the skippable video. The conversion prediction may be a likelihood of a viewer making a purchase associated with the skippable video in the supplemental video content pod, for example.

The method 500 may include generating a viewer cost score. The viewer cost score generation module 130 may generate the viewer cost score. The viewer cost score may be generated at least in part by supplying (i) a total break marker count in the primary video content, and (ii) a total supplemental video content pod duration to a machine learning model. The viewer cost score may be indicative of a level of user frustration, e.g., a likelihood of the user exiting the primary video content during the non-skippable duration. The content server 110 may use the viewer cost score to determine a time duration or number of videos for the supplemental video content pod.

The example method 500 includes, upon reaching a break marker in primary video content at block 520, present in a display the one or more non-skippable videos, and a total non-skippable countdown timer, the total non-skippable countdown timer indicating a non-skippable duration that (i) is at least as long as a total remaining duration of the one or more non-skippable videos, and (ii) does not include a full duration of a first video, of the one or more skippable videos, that immediately follows the one or more non-skippable videos.

The example method 500 includes, upon reaching an end of the total remaining non-skippable duration at block 530, present in the display (i) at least a first portion of the one or more skippable videos, and (ii) a skip user interface control that enables a user to skip at least one remaining video of the one or more skippable videos.

It should be understood that not all blocks of the exemplary computer-implemented method 500 are required to be performed, and/or the method 500 may include additional blocks not shown in FIG. 5.

As is apparent from the above description, some techniques disclosed herein use artificial intelligence to detect speaker pauses or scene transitions in primary video content that are suitable candidates for break marker insertion, to predict conversion metrics, and/or to estimate viewer cost score metrics. Artificial intelligence (AI) is a segment of computer science that focuses on the creation of models that can perform tasks with little to no human intervention. Artificial intelligence systems can utilize, for example, machine learning, natural language processing, and computer vision. Machine learning, and its subsets, such as deep learning, focus on developing models that can infer outputs from data. The outputs can include, for example, predictions and/or classifications. Natural language processing focuses on analyzing and generating human language. Computer vision focuses on analyzing and interpreting images and videos. Artificial intelligence systems can include generative models that generate new content, such as images, videos, text, audio, and/or other content, in response to input prompts and/or based on other information.

Example machine-learned models include neural networks or other multi-layer non-linear models. Example neural networks include feed forward neural networks, deep neural networks, recurrent neural networks, and convolutional neural networks. Some example machine-learned models can leverage an attention mechanism such as self-attention. For example, some machine-learned models can include multi-headed self-attention models (e.g., transformer models).

The model(s) can be trained using various training or learning techniques. The training can implement supervised learning, unsupervised learning, reinforcement learning, etc.

The training can use techniques such as, for example, backwards propagation of errors. For example, a loss function can be backpropagated through the model(s) to update one or more parameters of the model(s) (e.g., based on a gradient of the loss function). Various loss functions can be used such as mean squared error, likelihood loss, cross entropy loss, hinge loss, and/or various other loss functions. Gradient descent techniques can be used to iteratively update the parameters over a number of training iterations. A number of generalization techniques (e.g., weight decays, dropouts) can be used to improve the generalization capability of the models being trained.

The model(s) can be pre-trained before domain-specific alignment. For instance, a model can be pretrained over a general corpus of training data and finetuned on a more targeted corpus of training data. A model can be aligned using prompts that are designed to elicit domain-specific outputs. Prompts can be designed to include learned prompt values (e.g., soft prompts). The trained model(s) may be validated prior to their use using input data other than the training data and may be further updated or refined during their use based on additional feedback/inputs.

In some implementations, the content server 110 may use one or more of the machine learning models or techniques noted above to perform any one or more of the operations discussed herein in connection with machine learning. For example, the break marker insertion module 126 may use one or more such machine learning techniques to pre-train and/or finetune a model that detects scene transitions and/or speaker pauses as candidates for break marker solution. As another example, the conversion prediction model 128 may use one or more such machine learning techniques to pre-train and/or finetune a model that predicts a conversion metric for a particular non-skippable video or skippable video. As another example, the viewer cost score generation module 130 may use one or more such machine learning techniques to pre-train and/or finetune a model that estimates a viewer cost metric associated with a supplemental content pod.

Although the foregoing text sets forth a detailed description of numerous different aspects and implementations of the invention, it should be understood that the scope of the patent is defined by the words of the claims set forth at the end of this patent. The detailed description is to be construed as exemplary only and does not describe every possible implementation because describing every possible implementation would be impractical, if not impossible. Numerous alternative implementations could be implemented, using either current technology or technology developed after the filing date of this patent, which would still fall within the scope of the claims. The disclosure herein contemplates at least the following examples:

Example 1. A computer-implemented method for presenting video content, the method comprising: receiving, by one or more processors, primary video content comprising one or more break markers; presenting, by the one or more processors and on a display, at least a portion of the primary video content; receiving, from a server and by the one or more processors, a supplemental video content pod comprising (i) one or more non-skippable videos, followed by (ii) one or more skippable videos; upon reaching one of the one or more break markers in the primary video content, presenting, by the one or more processors and on the display, the one or more non-skippable videos, and a total non-skippable countdown timer, the total non-skippable countdown timer indicating a non-skippable duration that (i) is at least as long as a total remaining duration of the one or more non-skippable videos, and (ii) does not include a full duration of a first video, of the one or more skippable videos, that immediately follows the one or more non-skippable videos; and upon reaching an end of the non-skippable duration, presenting, by the one or more processors and on the display, (i) at least a portion of the one or more skippable videos, and (ii) a skip user interface control that enables a user to skip at least one remaining video of the one or more skippable videos.

Example 2. The method of Example 1, further comprising: responsive to receiving a selection of the skip user interface control before an end of the total remaining duration of the one or more skippable videos, (i) skipping, by the one or more processors, a remainder of the one or more skippable videos, and (ii) presenting, by the one or more processors, a remainder of the primary video content.

Example 3. The method of Examples 1 or 2, further comprising: responsive to receiving a selection of the skip user interface control before an end of the total remaining duration of the one or more non-skippable videos, (i) skipping, by the one or more processors, a remainder of a current skippable video of the one or more skippable videos, and (ii) presenting, by the one or more processors and on the display, a next skippable video of the one or more skippable videos.

Example 4. The method of any one of Examples 1-3, wherein presenting at least the portion of the one or more skippable videos and the skip user interface control further comprises presenting, on the display, a skippable countdown timer indicating a remaining duration of a currently displayed skippable video of the one or more skippable videos.

Example 5. The method of any one of Examples 1-3, wherein presenting at least the portion of the one or more skippable videos and the skip user interface control further comprises presenting, on the display, a skippable countdown timer indicating a total remaining skippable duration of the one or more skippable videos.

Example 6. The method of any one of Examples 1-5, further comprising: presenting, by the one or more processors and on the display, an indication of a total count of remaining non-skippable videos and remaining skippable videos.

Example 7. A system comprising: a memory; and one or more processors communicatively coupled to the memory, the one or more processors configured to perform any of the methods of Examples 1-6.

Example 8. A computer-implemented method for providing video content, the method comprising: providing, by one or more processors and to a client device, a supplemental video content pod, wherein the supplemental video content pod comprises one or more non-skippable videos followed by one or more skippable videos, and wherein providing the supplemental video content pod causes the client device to: upon reaching a break marker in primary video content presented by the client device on a display, present on the display the one or more non-skippable videos and a total non-skippable countdown timer, the total non-skippable countdown timer indicating a non-skippable duration that (i) is at least as long as a total remaining duration of the one or more non-skippable videos, and (ii) does not include a full duration of a first video, of the one or more skippable videos, that immediately follows the one or more non-skippable videos, and upon reaching an end of the non-skippable duration, present on the display (i) at least a portion of the one or more skippable videos, and (ii) a skip user interface control that enables a user to skip at least one remaining video of the one or more skippable videos.

Example 9. The method of Example 8, further comprising: providing, by the one or more processors to the client device, the primary video content comprising one or more break markers.

Example 10. The method of Examples 8 or 9, further comprising: inserting, by the one or more processors, the one or more break markers in the primary video content.

Example 11. The method of Example 10, wherein inserting the one or more break markers in the primary video content includes inserting a plurality of break markers, at least by: determining, a plurality of break candidate time windows that (i) are distributed according to a break interval and (ii) each comprise a respective portion of the primary video content; and inserting a break marker into each of the plurality of break candidate time windows in the primary video content based on one or more characteristics of the respective portion of the primary video content.

Example 12. The method of Example 11, wherein inserting the plurality of break markers further comprises: determining the break interval based on a length of the primary video content and a content break count.

Example 13. The method of any one of Examples 8-12, further comprising: generating, by the one or more processors, a conversion prediction for a skippable video of the one or more skippable videos at least in part by supplying a depth of the skippable video within the supplemental video content pod to a machine learning model, wherein the conversion prediction estimates a likelihood of the user making a purchase associated with the skippable video.

Example 14. The method of any one of Examples 8-13, further comprising: generating, by the one or more processors, a viewer cost score at least in part by supplying (i) a total break marker count in the primary video content, and (ii) a total supplemental video content pod duration, to a machine learning model, wherein the viewer cost score estimates a likelihood of the user exiting the primary video content during the non-skippable duration.

Example 15. A system comprising: one or more processors; and a memory storing instructions that, when executed by the one or more processors, cause the one or more processors to perform any of the methods of Examples 8-14.

The following additional considerations apply to the foregoing discussion. Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter of the present disclosure.

Unless otherwise apparent from the context of use, reference in the present disclosure to a same set of "one or more processors" (or a same "plurality of processors," etc.) performing multiple operations can encompass implementations in which performance of the operations is divided among the processor(s) in any suitable way. For example, "generating, by one or more processors, X; and generating, by the one or more processors, Y" can encompass: (1) implementations in which a first set of one or more processors (e.g., in a first computing device) generates X and a distinct, second set of one or more processors (e.g., in a different, second computing device) independently generates Y; (2) implementations in which all processors in the set of one or more processors (e.g., all in the same device, or distributed among multiple devices) contribute to the generation of both X and Y; and (3) other variations.

Unless specifically stated otherwise, discussions in the present disclosure using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used in the present disclosure any reference to "one implementation" or "an implementation" means that a particular element, feature, structure, or characteristic described in connection with the implementation is included in at least one implementation or implementation. The appearances of the phrase "in one implementation" in various places in the specification are not necessarily all referring to the same implementation.

As used in the present disclosure, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Upon reading this disclosure, those of skill in the art will appreciate still additional alternative structural and functional designs through the principles described herein. Thus, while particular implementations and applications have been illustrated and described, it is to be understood that the disclosed implementations are not limited to the precise construction and components disclosed in the present disclosure. Various modifications, changes, and variations, which will be apparent to those skilled in the art, may be made in the arrangement, operation, and details of the method and apparatus disclosed in the present disclosure without departing from the spirit and scope defined in the appended claims.

What is claimed is:

1. A computer-implemented method for presenting video content, the method comprising:
    receiving, by one or more processors, primary video content comprising one or more break markers;
    presenting, by the one or more processors and on a display, at least a portion of the primary video content;
    receiving, from a server and by the one or more processors, a supplemental video content pod comprising (i) two or more non-skippable videos, followed by (ii) one or more skippable videos;
    upon reaching one of the one or more break markers in the primary video content, presenting, by the one or more processors and on the display, the two or more non-skippable videos, and a total non-skippable countdown timer, the total non-skippable countdown timer indicating a non-skippable duration that (i) is at least as long as a total remaining duration of the two or more non-skippable videos, and (ii) does not include a full duration of a first video, of the one or more skippable videos, that immediately follows the two or more non-skippable videos; and
    upon reaching an end of the non-skippable duration, presenting, by the one or more processors and on the display, (i) at least a portion of the one or more skippable videos, and (ii) a skip user interface control that enables a user to skip at least one remaining video of the one or more skippable videos.

2. The computer-implemented method of claim 1, further comprising:
    responsive to receiving a selection of the skip user interface control before an end of the total remaining duration of the one or more skippable videos, (i) skipping, by the one or more processors, a remainder of the one or more skippable videos, and (ii) presenting, by the one or more processors, a remainder of the primary video content.

3. The computer-implemented method of claim 1, further comprising:
    responsive to receiving a selection of the skip user interface control before an end of the total remaining duration of the one or more skippable videos, (i) skipping, by the one or more processors, a remainder of a current skippable video of the one or more skippable videos, and (ii) presenting, by the one or more processors and on the display, a next skippable video of the one or more skippable videos.

4. The computer-implemented method of claim 1, wherein presenting at least the portion of the one or more skippable videos and the skip user interface control further comprises presenting, on the display, a skippable countdown timer indicating a remaining duration of a currently displayed skippable video of the one or more skippable videos.

5. The computer-implemented method of claim 1, wherein presenting at least the portion of the one or more skippable videos and the skip user interface control further comprises presenting, on the display, a skippable countdown timer indicating a total remaining skippable duration of the one or more skippable videos.

6. The computer-implemented method of claim 1, further comprising:
    presenting, by the one or more processors and on the display, an indication of a total count of remaining non-skippable videos and remaining skippable videos.

7. A computer-implemented method for providing video content, the method comprising:
    providing, by one or more processors and to a client device, a supplemental video content pod comprising (i) two or more non-skippable videos followed by (ii) one or more skippable videos, wherein providing the supplemental video content pod causes the client device to:
    upon reaching a break marker in primary video content presented by the client device on a display, present on the display the two or more non-skippable videos and a total non-skippable countdown timer, the total non-skippable countdown timer indicating a non-skippable duration that (i) is at least as long as a total remaining duration of the two or more non-skippable videos, and (ii) does not include a full duration of a first video, of the one or more skippable videos, that immediately follows the two or more non-skippable videos, and
    upon reaching an end of the non-skippable duration, present on the display (i) at least a portion of the one or more skippable videos, and (ii) a skip user interface control that enables a user to skip at least one remaining video of the one or more skippable videos.

8. The computer-implemented method of claim 7, further comprising:

providing, by the one or more processors to the client device, the primary video content comprising one or more break markers.

9. The computer-implemented method of claim 8, further comprising:

inserting, by the one or more processors, the one or more break markers in the primary video content.

10. The computer-implemented method of claim 9, wherein inserting the one or more break markers in the primary video content includes inserting a plurality of break markers, at least by:

determining a plurality of break candidate time windows that (i) are distributed according to a break interval and (ii) each comprise a respective portion of the primary video content; and inserting a break marker into each of the plurality of break candidate time windows in the primary video content based on one or more characteristics of the respective portion of the primary video content.

11. The computer-implemented method of claim 10, wherein inserting the plurality of break markers further comprises:

determining the break interval based on a length of the primary video content and a content break count.

12. The computer-implemented method of claim 7, further comprising:

generating, by the one or more processors, a conversion prediction for a skippable video of the one or more skippable videos at least in part by supplying a depth of the skippable video within the supplemental video content pod to a machine learning model, wherein the conversion prediction estimates a likelihood of the user making a purchase associated with the skippable video.

13. The computer-implemented method of claim 7, further comprising:

generating, by the one or more processors, a viewer cost score at least in part by supplying (i) a total break marker count in the primary video content, and (ii) a total supplemental video content pod duration, to a machine learning model, wherein the viewer cost score estimates a likelihood of the user exiting the primary video content during the non-skippable duration.

14. A system comprising:

one or more processors; and a memory storing instructions that, when executed by the one or more processors, cause the one or more processors to:

provide, to a client device, a supplemental video content pod comprising (i) two or more non-skippable videos followed by (ii) one or more skippable videos, wherein providing the supplemental video content pod causes the client device to:

upon reaching a break marker in primary video content presented by the client device on a display, present on the display the two or more non-skippable videos and a total non-skippable countdown timer, the total non-skippable countdown timer indicating a non-skippable duration that (i) is at least as long as a total remaining duration of the two or more non-skippable videos, and (ii) does not include a full duration of a first video, of the one or more skippable videos, that immediately follows the two or more non-skippable videos, and upon reaching an end of the non-skippable duration, present on the display (i) at least a portion of the one or more skippable videos, and (ii) a skip user interface control that enables a user to skip at least one remaining video of the one or more skippable videos.

15. The system of claim 14, wherein the instructions further cause the one or more processors to:

provide to the client device the primary video content comprising one or more break markers.

16. The system of claim 15, wherein the instructions further cause the one or more processors to:

insert the one or more break markers in the primary video content.

17. The system of claim 16, wherein inserting the one or more break markers in the primary video content includes inserting a plurality of break markers, at least by:

determining a plurality of break candidate time windows that (i) are distributed according to a break interval and (ii) each comprise a respective portion of the primary video content; and inserting the break marker at each of the plurality of break candidate time windows in the primary video content based on one or more characteristics of the respective portion of the primary video content.

18. The system of claim 17, wherein inserting the plurality of break markers further comprises:

determining the break interval based on a length of the primary video content and a break count.

19. The system of claim 14, wherein the instructions further cause the one or more processors to:

generate a conversion prediction for a skippable video of the one or more skippable videos at least in part by supplying a depth of the skippable video within the supplemental video content pod to a machine learning model, wherein the conversion prediction estimates a likelihood of the user making a purchase associated with the skippable video.

20. The system of claim 14, wherein the instructions further cause the one or more processors to:

generate a viewer cost score at least in part by supplying (i) a total break marker count in the primary video content, and (ii) a total supplemental video content pod duration to a machine learning model, wherein the viewer cost score estimates a likelihood of the user exiting the primary video content during the non-skippable duration.

* * * * *